(12) United States Patent
Gong (10) Patent No.: US 11,499,586 B2
(45) Date of Patent: Nov. 15, 2022

(54) ANTI-LOOSING BOLT COMPONENT CAPABLE OF PRESETTING TORQUE AND CONTROLLING DISASSEMBLY

(71) Applicant: Zuoyu Gong, Guigang (CN)

(72) Inventor: Zuoyu Gong, Guigang (CN)

(73) Assignee: Zuoyu Gong, Guigang (CN)

( * ) Notice: Subject to any disclaimer, the term of this patent is extended or adjusted under 35 U.S.C. 154(b) by 0 days.

(21) Appl. No.: 17/596,375

(22) PCT Filed: Jul. 17, 2019

(86) PCT No.: PCT/CN2019/096298
§ 371 (c)(1),
(2) Date: Dec. 8, 2021

(87) PCT Pub. No.: WO2021/000348
PCT Pub. Date: Jan. 7, 2021

(65) Prior Publication Data
US 2022/0186768 A1  Jun. 16, 2022

(30) Foreign Application Priority Data

Jul. 4, 2019  (CN) .......................... 201910599749.5

(51) Int. Cl.
  *F16B 39/282*  (2006.01)
  *F16B 39/24*  (2006.01)
(52) U.S. Cl.
  CPC ............ *F16B 39/282* (2013.01); *F16B 39/24* (2013.01)

(58) Field of Classification Search
  CPC ........ F16B 39/24; F16B 39/282; F16B 39/32; Y10S 411/957; Y10S 411/961; Y10S 411/962
  (Continued)

(56) References Cited

U.S. PATENT DOCUMENTS 737,044 A * 8/1903 Thorne ................... F16B 39/32
                                              411/114
845,643 A * 2/1907 Hughes ................... F16B 39/32
                                              411/956
(Continued)

FOREIGN PATENT DOCUMENTS

CN          102245914 A      11/2011
CN          204199120 U       3/2015
(Continued)

*Primary Examiner* — Roberta S Delisle
(74) *Attorney, Agent, or Firm* — CBM Patent Consulting, LLC (57) ABSTRACT

The disclosure relates to an anti-loosing bolt component capable of presetting torque and controlling disassembly, including: a nut, a bolt and a tab washer that match each other. The nut is provided with a ratchet structure, the bolt is provided with an axial groove, and the tab washer is provided with a elastic pawl matched with the ratchet structure, and a horizontal protrusion provided with a prefabricated notch and matched with the axial groove. The ratchet structure adopts a matching mode that the difference between the number of ratchets and the number of the elastic pawls is 1, so that the nut can be engaged by a very small rotation angle. The preset torque of the prefabricated notch can be set according to a safety factor. The bolt component can be accurately prevented from loosening.

9 Claims, 7 Drawing Sheets

(58) Field of Classification Search
USPC .......................... 411/81, 114, 136, 138, 141
See application file for complete search history.

(56) References Cited

U.S. PATENT DOCUMENTS

| | | | | |
|---|---|---|---|---|
| 848,176 | A * | 3/1907 | Jordan | F16B 39/32 |
| | | | | 411/964 |
| 907,473 | A * | 12/1908 | DeTray | F16B 39/24 |
| | | | | 411/957 |
| 954,010 | A * | 4/1910 | Alt | F16B 39/24 |
| | | | | 411/138 |
| 1,058,386 | A * | 4/1913 | Price | F16B 39/24 |
| | | | | 411/138 |
| 3,329,190 | A * | 7/1967 | Oldenkott | F16B 39/24 |
| | | | | 411/149 |
| 3,605,845 | A * | 9/1971 | Junker | F16B 39/282 |
| | | | | 411/959 |
| 6,776,565 | B2 * | 8/2004 | Chang | F16B 39/282 |
| | | | | 411/149 |
| 7,128,511 | B2 * | 10/2006 | Hewgill | F16B 39/24 |
| | | | | 411/533 |
| 2005/0207865 | A1 * | 9/2005 | Disantis | F16B 39/282 |
| | | | | 411/160 |
| 2007/0196195 | A1 * | 8/2007 | Lin | F16B 39/24 |
| | | | | 411/161 |
| 2019/0003517 | A1 | 1/2019 | Hess | |
| 2019/0048919 | A1 | 2/2019 | Hess et al. | |

FOREIGN PATENT DOCUMENTS

| | | |
|---|---|---|
| CN | 105003519 A | 10/2015 |
| CN | 105090208 A | 11/2015 |
| CN | 109578422 A | 4/2019 |

* cited by examiner

ANTI-LOOSING BOLT COMPONENT CAPABLE OF PRESETTING TORQUE AND CONTROLLING DISASSEMBLY

TECHNICAL FIELD

The present disclosure relates to the technical field of fastener connection. More specifically, the present disclosure relates to an anti-loosing bolt component capable of presetting torque and controlling disassembly.

BACKGROUND

In the fields of transportation, industrial manufacturing, building construction, mining, etc., many equipment and facilities operate at high speed for a long time, resulting in a strong and continuous vibration. If bolt components used for connection and fastening are loose and fall off, it is very prone to cause serious safety accidents. It requires that the bolt components have a reliable anti-loosening function and are easy to disassemble to facilitate maintenance and upgrade reconstruction for those equipment and facilities. Currently, the bolt components that have reliable anti-loosening functions and are easy to be disassembled mainly include Japanese hard lock nut and Chinese Tang nut. However, these two nuts also have disadvantages. The hard lock nut consists of an eccentric convex nut and a non-eccentric concave nut, which has particularly different corresponding eccentricities for different sizes and materials and is expensive and extremely difficult to manufacture. The Tang nut consists of a left-handed nut and a right-handed nut, and is used combined with a screw with double-rotational, non-continuous, cross-section variable thread. The thread has complicated structure and high cost, and also has defects in that: the thread cannot be compatible with other bolt components, and the strength of the thread is weakened because a stress area of the thread is greatly reduced. In addition, these two bolt components are double-nut structure so that two nuts need to be screwed in one operation, which are time-consuming and have low efficiency.

SUMMARY

An object of the present disclosure is to solve at least the above problems and to provide at least advantages that will be described hereinafter.

Another object of the present disclosure is to provide an anti-loosing bolt component capable of presetting torque and controlling disassembly, which has reliable function, simple structure, low manufacturing cost, good compatibility, less work and high efficiency.

In order to achieve these objects and other advantages according to the present disclosure, an anti-loosing bolt component capable of presetting torque and controlling disassembly is provided, comprising a nut, a bolt and a tab washer that match each other, wherein:

a radial annular flange is arranged at one end of the nut close to a fastener, or at one end of a screw cap of the bolt close to the fastener, an annular groove is provided at an annular middle position of an end face where the annular flange is located, a ratchet structure is arranged at a bottom surface of the annular groove, and an elastic pawl matched with the ratchet structure is arranged at the tab washer;

or wherein an axial groove is arranged at a screw rod of the bolt; and a horizontal protrusion matched with the axial groove is arranged at the tab washer;

or wherein a vertical protrusion that is folded toward the fastener is arranged at the tab washer;

wherein the horizontal protrusion and the vertical protrusion are provided with a prefabricated notch.

Further, an outer diameter of the annular flange is greater than an outer diameter of the nut or the screw cap to increase a contact area of the nut or the screw cap to the fastener and compensate for a missing contact area caused by the occupation of the contact area by the annular groove.

Further, the ratchet structure is evenly and radially arranged at the bottom surface of the annular groove, wherein a gentle face of the ratchet structure faces a tightening direction of the nut or the screw cap, a steep face of the ratchet structure faces a loosening direction of the nut or the screw cap, a highest point of the ratchet structure is lower than an end face of the annular flange, and the drop between the highest point and the end face is less than or equal to a thickness of the tab washer.

Further, a matching mode of the ratchet structure and the elastic pawl is as follow: the ratchet structure is arranged in a mode that one ratchet independently matches with one elastic pawl, and the number of ratchets is provided as much as possible; If the number of the elastic pawls is N, a ratio between the number of the elastic pawls and the number of the ratchets is N:N+1 or N:N−1. The elastic pawl is evenly and radially arranged on an annular ring body of the tab washer to match with the ratchet structure so that when the nut or the screw cap is rotated 1/N angle of one ratchet during tightening, there is one elastic pawl fully engaged and locked with the ratchet structure, and there is no less than one elastic pawl incompletely engaged with the ratchet structure. Incompletely engaged parts can continue to engage with the rotation of the nut or the screw cap, and can form an uninterrupted engaging alternately with the next engaging process. Therefore, compared with a situation that incomplete engagement can also achieve the use effect, the elastic pawl and the ratchet structure can be engaged and locked at any rotation angle of the nut or the screw cap, and the nut or the screw cap can only be rotated in the tightening direction and cannot be rotated in the loosening direction.

The ratchet structure is arranged in the annular groove and has a certain drop with the end face of the annular flange to define a matching depth of the tab washer and the ratchet structure, to prevent the ratchet structure from flattening the elastic pawl, and to prevent the ratchet structure and the elastic pawl from being damaged due to pressure, so that when the nut or the screw cap is tightened, the ratchet structure can easily and smoothly pass the elastic pawl to reduce the consumption of a tightening torque by the elastic pawl. At the same time, the annular groove can form a fully enclosed space when the nut or the screw cap is tightened, which can protect the ratchet structure and the elastic pawl from moisture and dust, and delay oxidation and aging. Through the matching mode of the ratchet structure and the elastic pawl, the elastic pawl and the ratchet structure can be engaged and locked with only a small rotation angle when the nut or the screw cap is tightened, which ensures that a pre-tightening torque or a tightening torque of the bolt component can be accurately controlled. For example, the number of the ratchets is 12, and the number of the elastic pawls is 13. When the nut or the screw cap is rotated 2.3 degrees, there is one elastic pawl that is fully engaged and locked with the ratchet structure. If the number of the ratchets is increased to 18, and the number of the elastic pawls is increased to 19, the above engaging and locking can be completed by 1 degree of rotation.

Further, the axial groove is arranged at a threaded section of the screw rod of the bolt along the axial direction, the horizontal protrusion matched with the axial groove is arranged in an inner hole of the tab washer, and the horizontal protrusion and the axial groove cooperate to prevent the tab washer from rotating.

The rotation of the above tab washer is prevented by the cooperation of the horizontal protrusion and the axial groove, the nut is prevented from rotating in the loosening direction by the cooperation of the elastic pawl and the ratchet structure, so that the anti-loosening of the bolt component is realized.

In actual use, ordinary gaskets need to be added in order to increase the contact area of the fastener or adjust the length of the screw rod. When said anti-loosing bolt component is added with any ordinary gasket between the fastener and the tab washer, the use effect is not affected.

Further, the annular ring body of the tab washer is provided with a rectangular notch that contacts the inner hole from the outer side of the inner hole, or is provided with a rectangular hole that is away from the inner hole from the outer side of the inner hole; wherein the vertical protrusion that is folded toward the fastener is arranged at a lateral outer edge of the rectangular notch or a lateral edge of the rectangular hole, and the vertical protrusion cooperates with a corresponding vertical concave hole provided on an end face of the fastener to prevent the rotation of the tab washer.

Further, a top end of the vertical protrusion of the rectangular hole is set as a pointed end, and the pointed end is located on a section center point of the vertical protrusion, the pointed end is configured to facilitate accurate position of the vertical concave hole. A part of the vertical protrusion excluding the pointed end and the prefabricated notch is set as a cylindrical shape with a diameter same as a diameter of a corresponding standard twist drill, to enable the vertical concave hole cooperated with it to be formed by one-time drilling. The cylindrical shape of the vertical protrusion is formed by welding or bonding on both sides of the vertical protrusion.

Through the above tab washer, the vertical protrusion cooperates with a corresponding vertical concave hole provided on the end face of the fastener to prevent the rotation of the tab washer, the nut or the bolt is prevented from rotating in the loosening direction by the cooperation of the elastic pawl and the ratchet structure, so that the anti-loosening of the bolt component is realized. The tab washer provided with the rectangular notch is suitable for the fastener with a prefabricated connection hole during production. The connecting hole is set as a circular hole with the rectangular notch, and the rectangular notch is matched with the vertical protrusion. The tab washer provided with the rectangular hole is suitable for the fastener whose vertical concave hole need to be set on site.

Further, a prefabricated notch is arranged at a connection position of the horizontal protrusion at an edge of the inner hole of the tab washer, or at a connection position of the vertical protrusion at an edge of the bottom of the tab washer. The prefabricated notch is an etched dent that is configured to make a maximum torque that a cross-sectional area of the connection position can withstand equal to a preset torque, and to subtract an excess cross-sectional area. The preset torque is a torque that is configured to be set through multiplying a tightening torque standard value by a safety factor required to prevent loosening, and configured to prevent the bolt from loosening and control disassembly of the bolt, wherein the tightening torque standard value is specified for the bolt according to a tightening torque specification or according to a known vibration force that causes the bolt to loosen, wherein the safety factor is not less than 1.1 times. The prefabricated notch can be set on one side or on both sides, and there may be a crack-guiding gap at one or both ends. When a loosening torque is greater than the preset torque, the horizontal protrusion or the vertical protrusion breaks at the prefabricated notch and separates from the annular ring body of the tab washer, to enable the bolt to be disassembled.

Further, the preset torque is set according to the actual needs for anti-loosening, and is active prevention and control setting to reduce the loosening risk by improving the safety factor. Theoretically, the loosening risk can be reduced indefinitely by improving the preset torque infinitely within the maximum loosening torque range that the bolt component can withstand, so that the bolt component is infinitely close to absolutely no looseness or permanently no looseness, but disassembly is very difficult. For general applications that are not required for special anti-loosening needs, it is more in line with the requirements of application by giving consideration to both relatively high safety and relatively easy disassembly. Therefore, the preset torque is appropriately higher than the tightening torque standard value of the bolt, which is more practical and suitable for mass production and commercial application.

Further, the preset torque is a rounded integer obtained by the tightening torque standard value multiplied by the safety factor, and is marked on the corresponding tab washer together with the corresponding bolt specification and performance grade. In actual use, the specification and the grade of the tab washer can be selected according to the same specification and the performance grade of the bolt, and the tab washer with the same specification and higher grade may also be selected. But the tab washer with the same specification and lower grade is not recommended. If there are special anti-loosening requirements, the preset torque marked on the tab washer shall be used as a selection standard.

Further, given the cost issue, if the preset torque of two adjacent grades of the performance grade is too close, the lower grade can be cancelled and the two adjacent grades share the tab washer with a higher grade. For practical needs, for the highest performance grade, a tab washer with a higher preset torque also needs to be added. The higher preset torque is set by the tightening torque standard value multiplied by double safety factor. Take a specification of the bolt as M14, and the safety factor is preferably 1.5 times as an example, the preset torques for performance grades of 4.8, 5.8, 8.8, 10.9, and 12.9 are rounded to integers of 110, 120, 210, 270, 380 N·m, respectively. The preset torque 110 N·m for the performance grade of 4.8 and the preset torque 120 N·m for performance grade of 5.8 are too close, so the preset torque 110 N·m for performance grade of 4.8 can be cancelled, and the bolt with the performance grade of 4.8 and the bolt with the performance grade of 5.8 share the tab washer with the preset torque 120 N·m for performance grade of 5.8. For the performance grade of 12.9, a tab washer with the preset torque of 560 N·m (higher grade) needs to be added for standby application. In actual use, take the bolt with the performance grade of 8.8 as an example, the tab washer with the performance grade of 8.8 (same grade) and the preset torque of 210 N·m is generally selected. For a bolt with higher anti-loosening requirements, the tab washer with the performance grade of 10.9 (higher grade) and the preset torque of 270 N·m can be selected. When the bolt is disassembled, if the loosening torque of the bolt with the performance grade of 8.8 is greater than 210 N·m, and the loosening torque of the bolt with the performance grade of 10.9 is greater than 270 N·m, the bolt can be disassembled.

The above prefabricated notch is a key setting for the anti-loosing bolt component capable of presetting torque and controlling disassembly of the present disclosure, which makes the bolt component change from a non-disassemble dead bolt component to a disassemble live bolt component, and also enables the bolt component to be accurately prevented from loosening according to actual anti-loosening needs. Therefore, the loosening of the bolt component can be prevented and controlled, and the disassembly of the bolt component is simple, easy and fast.

Further, an outer diameter of the tab washer is greater than an outer diameter of the annular flange.

Further, when the nut cooperates with the bolt provided with the axial groove, a fully enclosed cap is provided on a top end of the nut to protect the axial groove, the horizontal protrusion and screw pairs from moisture and dust corrosion, and to delay oxidation and aging.

For the above anti-loosening bolt component, the annular groove forms a fully enclosed space when the nut or the screw cap is tightened, which can protect the ratchet structure and the elastic pawl. The fully enclosed cap on the top end of the nut can protect the axial groove, the horizontal protrusion and the screw pairs. The anti-loosening bolt component can be used in complex outdoor environments because of a fully enclosed structure.

Further, the elastic pawl, the horizontal protrusion and the vertical protrusion are directly formed through stamping by the tab washer, the horizontal protrusion comprising an expanded bend is formed through integral stamping, the vertical protrusion of the rectangular hole comprising a pointed end is formed through integral stamping, and the rectangular notch and the rectangular hole are formed after the vertical protrusion is stamped by the tab washer. The stamping and forming method used in manufacturing can save labor and material, and reduce cost.

Further, The horizontal protrusion is provided with the expanded bend that is bent along the bottom surface of the axial groove to the top end of the axial groove, so as to increase a contact area between the horizontal protrusion and the axial groove, so that the restriction of the axial groove on the horizontal protrusion is more stable, and the axial groove is subject to reduced damage due to the increase of stressed area when the horizontal protrusion is broken during disassembling of the bolt component.

Further, the strength of single ratchet of the ratchet structure and single elastic pawl of the tab washer is greater than the strength of the horizontal protrusion or the vertical protrusion at the prefabricated notch in order to ensure that the nuts and the bolt are intact and can be reused after being disassembled, and only a new tab washer is replaced for re-installation.

Finally, the above anti-loosening bolt component has good compatibility, do not affect the anti-loosing effect when cooperating with ordinary bolts, ordinary nuts or ordinary threaded holes (see Embodiments 2-7 for details), has a wide application range, and can meet different applications requirements for connecting fasteners.

The present disclosure at least includes the following advantageous effects:

The present disclosure has an exquisite design and a reasonable structure, and the various parts are interlocked and cooperated with each other. The bolt component can be smoothly tightened, and only needs a small rotation angle for engaging and locking to prevent loosening. The bolt component can be easily disassembled by applying a torque greater than the preset torque. The present disclosure completely solves two common problems that ordinary anti-loosening bolt can only prevent loosening at a fixed position and cannot meet the control needs of a pre-tightening torque or a tightening torque, and that the bolt is difficult to be disassembled or even cannot be disassembled.

The present disclosure has high safety. The bolt component can be accurately prevented from loosening according to actual anti-loosening needs, and the loosening problem of the bolt can be prevented and controlled. The bolt component has good compatibility, do not affect the anti-loosing effect when cooperating with ordinary bolts, ordinary nuts or ordinary threaded holes, has a wide application range, has good closeness, e.g., a fully enclosed structure for using in complex outdoor environments, and has simple structure. A single nut structure and the tab washer are directly formed through stamping, which reduces manufacturing cost of the bolt component. The bolt component can be rapidly installed, which can save half of the man-hours compared with a double-nut structure that is installed by screwing two nuts in one operation, has doubled the working efficiency, and reduces using cost of the bolt component.

The anti-loosing bolt component capable of presetting torque and controlling disassembly of the present disclosure has obvious advantages if it is applied to the field of rail transit where a large number of bolts are used intensively, such as high-speed rail tracks, etc. Fast installation can speed up the construction progress and save installation costs, controllable anti-loosing can ensure the construction quality and reduce later maintenance costs, and easy disassembly can facilitate later upgrades and save related costs.

Other advantages, objects and features of the present disclosure will be partially reflected by the following description, and will be partially understood by those skilled in the art through researching and practicing the present disclosure.

DETAILED DESCRIPTION

The present disclosure will be further described in detail hereinafter with reference to the accompanying drawings, so that those skilled in the art can implement the present disclosure with reference to the specification.

Embodiment 1

As shown in FIG. 1, FIG. 2, FIG. 3 and FIG. 7, an anti-loosing bolt component capable of presetting torque and controlling disassembly includes a nut 11, a bolt 21 and a tab washer 31 that match each other. The bolt 11 includes a screw cap 1101 and a screw rod 1102. An axial groove 1103 is arranged at the screw rod 1102 along the axial direction, and the axial groove 1103 is arranged at a threaded section of the screw rod 1102 to facilitate the installation of the tab washer 31. A radial annular flange 2101 is arranged at one end of the nut 21 close to a fastener. An outer diameter of the annular flange 2101 is greater than an outer diameter of the nut 21, an annular groove 2102 is provided at an annular middle position of an end face where the annular flange 2101 is located, and a ratchet structure 2103 is evenly and radially arranged at the bottom surface of the annular groove 2102. The tab washer 31 is annular, and an outer diameter of the tab washer 31 is larger than the outer diameter of the annular flange 2101. A horizontal protrusion 3101 matched with the axial groove 1103 is arranged at an inner hole of the tab washer 31, and an elastic pawl 3102 matched with the ratchet structure 2103 is arranged on an annular ring body of the tab washer 31. When the anti-loosening bolt component of this embodiment is installed and tightened, the tab washer 31 and the nut 21 are installed on the fastener in turn. Since the horizontal protrusion 3101 is engaged into the axial groove 1103 of the bolt 11, the tab washer 31 cannot rotate. Then rotate the nut 21 to fully engage the ratchet structure 2103 and the elastic pawl 3102. Since a gentle face of the ratchet structure 2103 faces a tightening direction of the nut 21, and a steep face of the ratchet structure 2103 faces a loosening direction of the nut 21, the nut 21 can only rotate in the tightening direction but not in the loosening direction, so as to achieve the purpose of preventing loosening. The highest point of the ratchet structure 2103 is lower than an end face of the annular flange 2101, and a drop between the highest point and the end face is less than or equal to a thickness of the tab washer 31, preferably equal to ½ of the thickness of the tab washer 31, which is used to limit a matching depth of the tab washer 31 and the ratchet structure 2103, prevent the ratchet structure 2103 from flattening the elastic pawl 3102, and prevent the ratchet structure 2103 and the elastic pawl 3102 from being damaged by pressure, so that the ratchet of the ratchet structure 2103 can easily and smoothly pass the elastic pawl 3102 when the nut 21 is tightened, thereby reducing the influence of the elastic pawl 3102 on a tightening torque. The ratchet structure 2103 is arranged in a mode that one ratchet independently matches with one elastic pawl 3102, and the number of ratchets of the ratchet structure 2103 is provided as much as possible. The number of the elastic pawls 3102 is N, which is one more than the number of the ratchets. The elastic pawl 3102 evenly and radially matches with the ratchet structure 2103 so that when the nut 21 rotates 1/N angle of one ratchet, there is one elastic pawl 3102 fully engaged and locked with the ratchet structure 2103, so that the tightening torque of the bolt component can be accurately controlled by rotating a very small rotation angle to engage and lock when the nut 21 is tightened. The horizontal protrusion 3101 is provided with a prefabricated notch 3103 along a connection position of an edge of an inner hole of the tab washer 31, and the prefabricated notch 3103 is an etched dent that is configured to make a maximum torque that a cross-sectional area of a connection position can withstand equal to a preset torque and to subtract an excess cross-sectional area. The preset torque of the prefabricated notch 3103 is set through multiplying a tightening torque standard value specified for the bolt 11 according to a tightening torque specification by a required safety factor. The safety factor is preferably 1.5 times, and the preset torque setting to prevent the nut 21 from loosening is higher than 1.5 times of the tightening torque standard value, which improves controllability and safety of anti-loosening. When the anti-loosening bolt component in this embodiment needs to be disassembled, only a loosening torque greater than the preset torque is applied, the horizontal protrusion 3101 breaks at the prefabricated notch 3103, and the nut 21 is disassembled. A fully enclosed cap 2104 is provided on the top end of the nut 21 to protect the axial groove 1103, the horizontal protrusion 3101 and screw pairs from moisture and dust corrosion, and to delay oxidation and aging. At the same time, the annular groove 2102 can form a fully enclosed space when the nut 21 is tightened, which can protect the ratchet structure 2103 and the elastic pawl 3102 from moisture and dust corrosion, and delay oxidation and aging. A fully enclosed structure enables the anti-loosening bolt component of the present disclosure to be used in a complex outdoor environment. In actual use, ordinary gaskets need to be added in order to increase the contact area of the fastener or adjust the length of the screw rod 1102. When the anti-loosing bolt component in this embodiment is added with any ordinary gasket between the fastener and the tab washer 31, the use effect is not affected.

Embodiment 2

Figure 4:
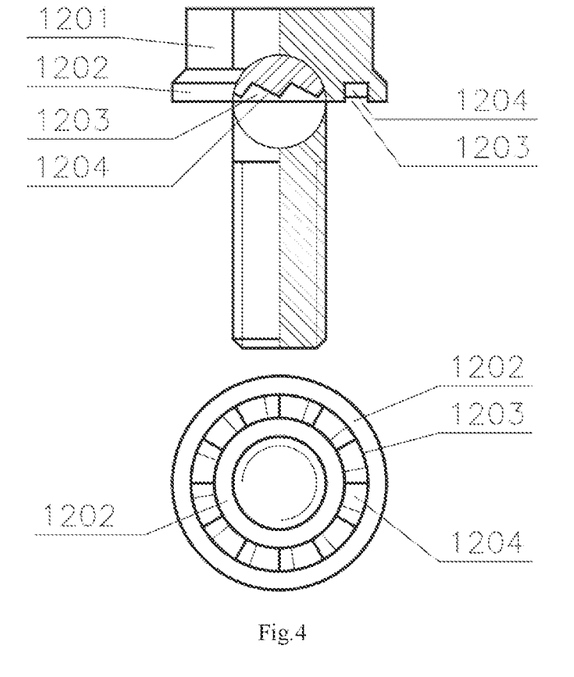
FIG. 4 is a vertical section view and a bottom view of a bolt 12 according to a second embodiment of the bolt of the present disclosure.
Figure 5:
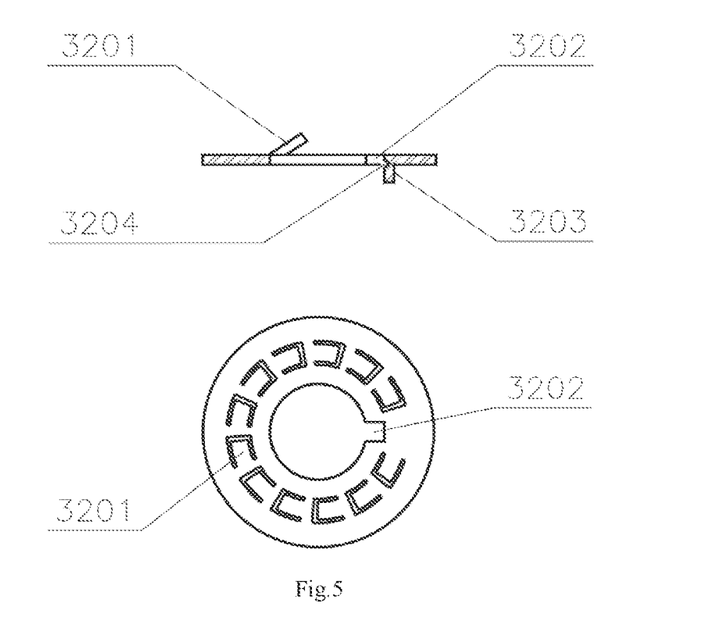
FIG. 5 is a vertical section view and a top view of a tab washer 32 according to a second embodiment of the tab washer of the present disclosure.
Figure 8:
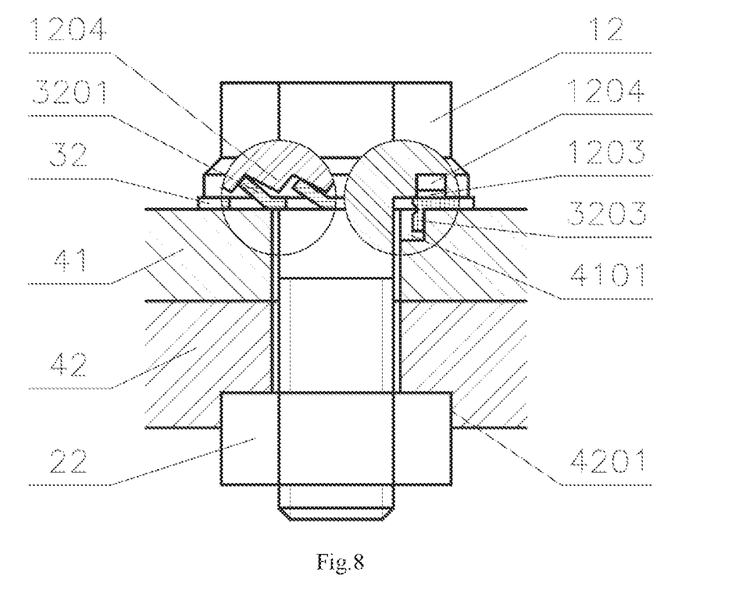
FIG. 8 is a usage status view according to Embodiment 2 of the present disclosure.

As shown in FIG. 4, FIG. 5 and FIG. 8, an anti-loosing bolt component capable of presetting torque and controlling disassembly includes a bolt 12, a nut 22 and a tab washer 32 that match each other. A radial annular flange 1202 is arranged at one end of a screw cap 1201 of the bolt 12 close to a fastener 41. An outer diameter of the annular flange 1202 is greater than an outer diameter of the screw cap 1201, and an annular middle position of the annular flange 1202 is provided with an annular groove 1203 and a ratchet structure 1204 whose structures are the same as those of the annular groove 2102 and the ratchet structure 2103 in the embodiment 1, respectively. No axial groove is arranged at a screw rod of the bolt 12, and the nut 22 is an ordinary nut that matches with the bolt 12. The tab washer 32 is annular, and an outer diameter of the tab washer 32 is larger than the outer diameter of the annular flange 1202. The tab washer 32 is basically the same as the tab washer 31 in the embodiment 1, the difference is as follow: the tab washer 32 is not provided with a horizontal protrusion, and the number of the elastic pawls 3201 is subtracted by one to set a rectangular notch 3202. The rectangular notch 3202 contacts the inner hole of the tab washer 32 from the outer side of the inner hole, a vertical protrusion 3203 that is folded toward the fastener 41 is arranged at a lateral outer edge of the rectangular notch 3202, and a prefabricated notch 3204 is arranged at a connection position of the vertical protrusion 3203 at an edge of the bottom of the tab washer 32. The prefabricated notch 3204 is the same as the prefabricated notch 3103 of the tab washer 31. A vertical concave hole 4101 matched with the vertical protrusion 3203 is arranged on an end surface of the fastener 41. An embedding groove 4201 is arranged at a surface where the fastener 42 is in contact with the nut 22, the embedding groove 4201 has the same shape as the nut 22, and the nut 22 is embedded in the embedding groove 4201. When the anti-loosening bolt component of this embodiment is installed and tightened, the tab washer 32 and the bolt 12 are sequentially installed on the fastener 41. The vertical protrusion 3203 is clamped into the vertical concave hole 4101, and the tab washer 32 cannot be rotated. The nut 22 is embedded in the embedding groove 4201, and the nut 22 cannot be rotated. Then the bolt 12 is rotated to fully engage the ratchet structure 1204 and the elastic pawl 3201, and the bolt 12 can only rotate in the tightening direction but not in the loosening direction, so as to achieve the purpose of anti-loosening. When the bolt 12 needs to be disassembled, only a loosening torque greater than the preset torque of the prefabricated notch 3204 is applied, the bolt 12 can be disassembled.

Embodiment 3

Figure 6:
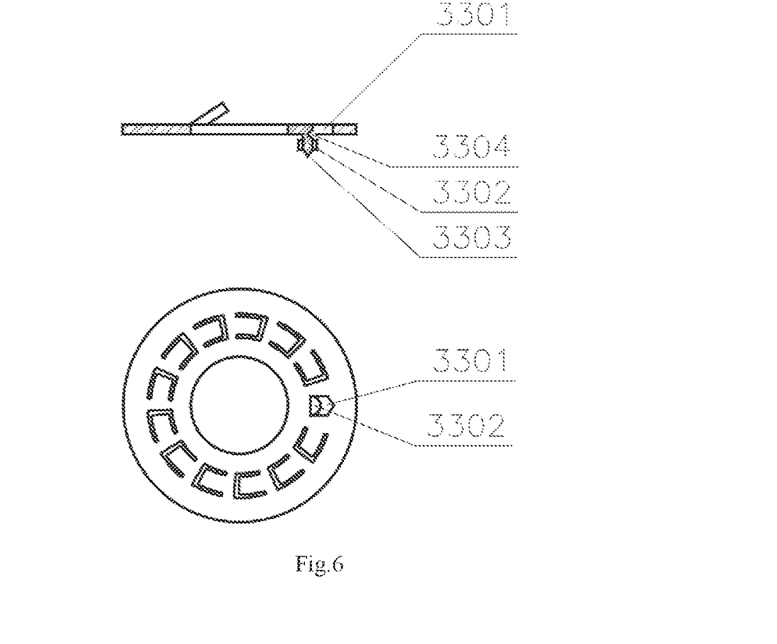
FIG. 6 is a vertical section view and top view of a tab washer 33 according to a third embodiment of the tab washer of the present disclosure.
Figure 7:
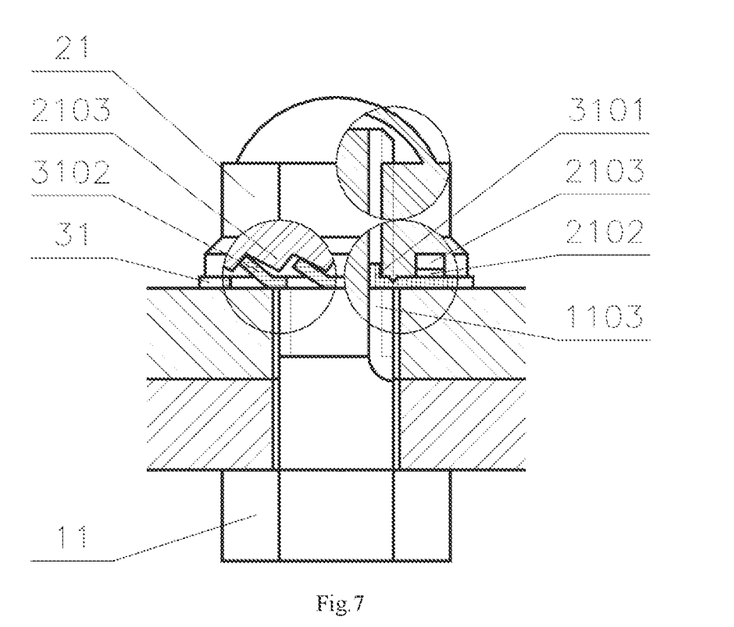
FIG. 7 is a usage status view according to Embodiment 1 of the present disclosure.
Figure 9:
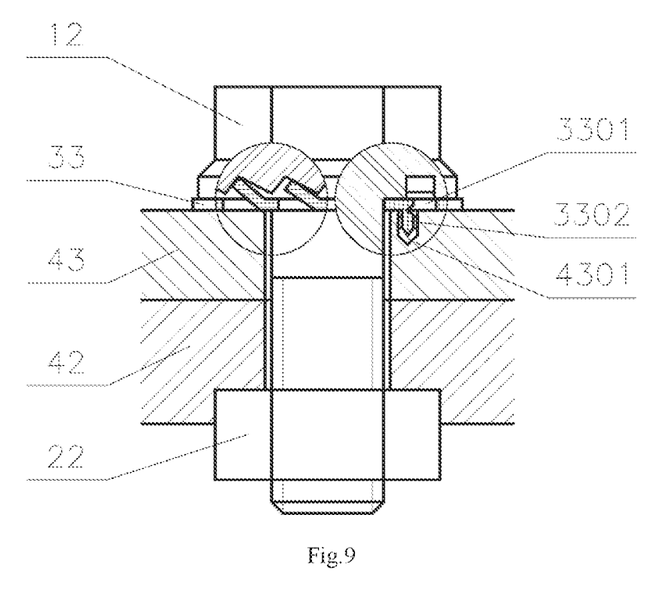
FIG. 9 is a usage status view according to Embodiment 3 of the present disclosure.

As shown in FIG. 4, FIG. 6 and FIG. 9, an anti-loosing bolt component capable of presetting torque and controlling disassembly includes a bolt 12, a nut 22 and a tab washer 33 that match each other. This embodiment is basically the same as embodiment 2, and the difference is as follow: the tab washer 33 of this embodiment replaces the tab washer 32 of the embodiment 2. The tab washer 33 is basically the same as the tab washer 32, and the difference is as follow: no rectangular notch is arranged at the tab washer 33, and a rectangular hole 3301 that is away from the inner hole of the tab washer 33 from the outer side of the inner hole is arranged at a middle position of an annular ring body. A vertical protrusion 3302 that is folded toward a fastener 43 is arranged at a lateral inner edge of the rectangular hole 3301, the top end of the vertical protrusion 3302 is set as a pointed end 3303, and the pointed end 3303 is located on a section center point of the vertical protrusion 3302. A prefabricated notch 3304 is arranged at a connection position of the vertical protrusion 3302 at an edge of the bottom of the tab washer 33. The prefabricated notch 3304 is the same as the prefabricated notch 3204 of the tab washer 32. A part of the vertical protrusion 3302 excluding the pointed end 3303 and the prefabricated notches 3304 is set as a cylindrical shape with a diameter same as a diameter of a corresponding standard twist drill. A vertical concave hole 4301 matched with the vertical protrusion 3302 is arranged on an end surface of the fastener 43. When setting the vertical concave hole 4301, firstly, the pointed end 3303 is used to facilitate the accurate location of the vertical concave hole 4301, and then the standard twist drill with the same diameter as the cylindrical shape set in the vertical protrusion 3302 is used to drill the vertical concave hole. The vertical concave hole 4301 can be set to be formed by one-time drilling.

Embodiment 4

Figure 10:
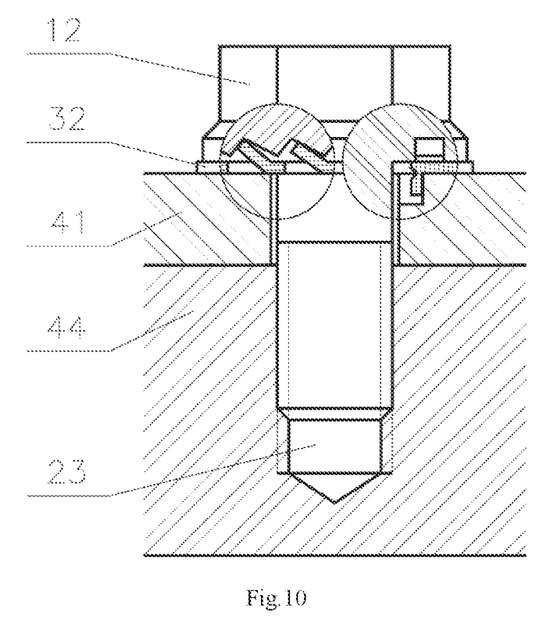
FIG. 10 is a usage status view according to Embodiment 4 of the present disclosure.

As shown in FIG. 4, FIG. 5 and FIG. 10, an anti-loosing bolt component capable of presetting torque and controlling disassembly includes a bolt 12, a tab washer 32, and a threaded hole 23 that match each other. This embodiment is basically the same as the embodiment 2, the difference is as follow: the threaded hole 23 of this embodiment replaces the nut 22 of the embodiment 2. The threaded hole 23 matches with the bolt 12, and is provided on the fastener 44.

Embodiment 5

Figure 11:
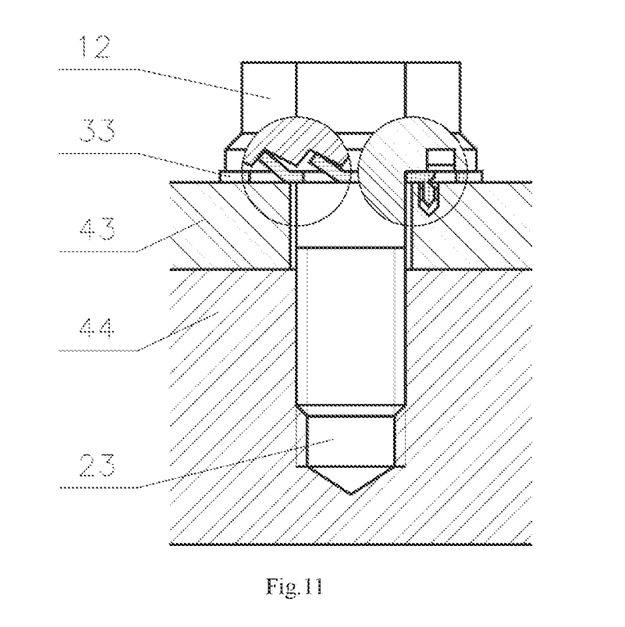
FIG. 11 is a usage status view according to Embodiment 5 of the present disclosure.

As shown in FIG. 4, FIG. 6 and FIG. 11, an anti-loosing bolt component capable of presetting torque and controlling disassembly includes a bolt 12, a tab washer 33, and a threaded hole 23 that match each other. This embodiment is basically the same as the embodiment 4, the difference is as follow: the tab washer 33 of this embodiment replaces the tab washer 32 of the embodiment 4. The difference between the tab washer 33 and the tab washer 32 and the fixing method are shown in the embodiment 3.

Embodiment 6

Figure 1:
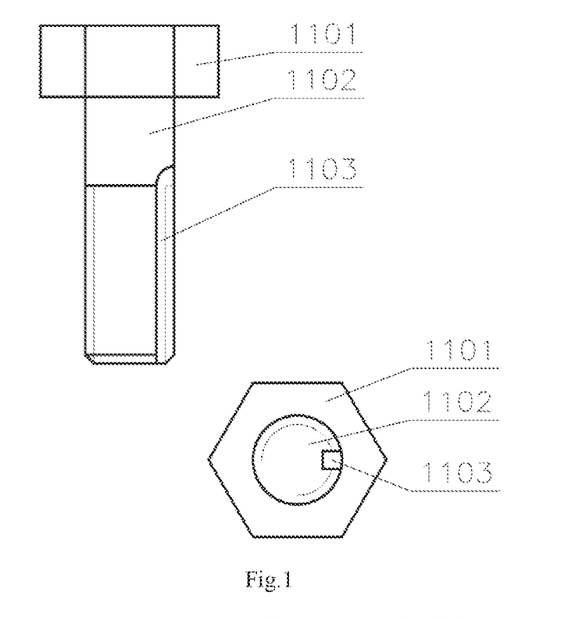
FIG. 1 is a vertical section view and a bottom view of a bolt 11 according to a first embodiment of the bolt of the present disclosure.
Figure 2:
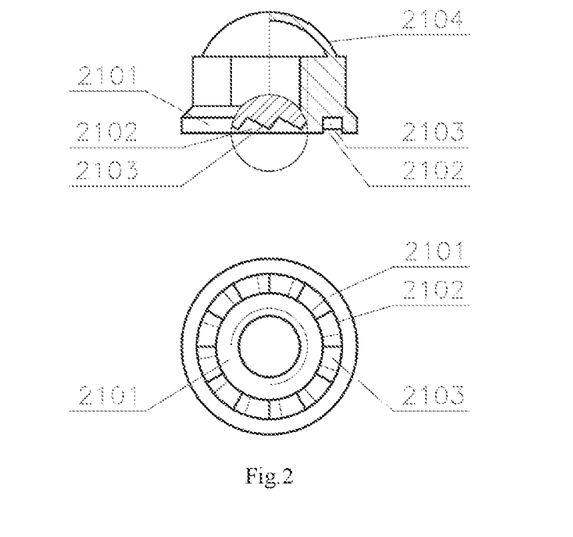
FIG. 2 is a vertical section view and a bottom view of a nut 12 according to a first embodiment of the nut of the present disclosure.
Figure 3:
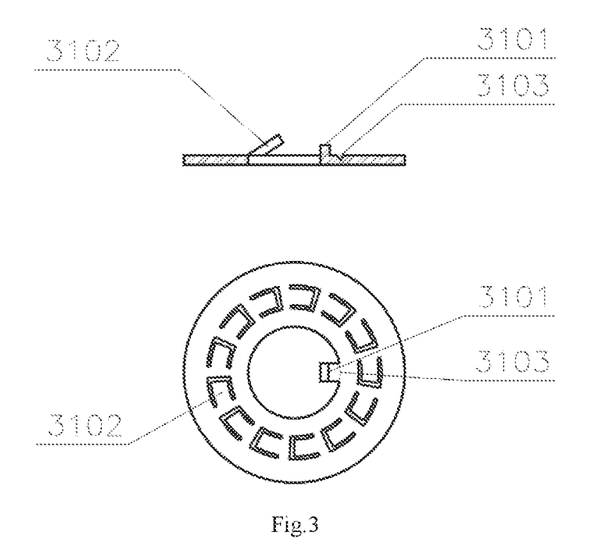
FIG. 3 is a vertical section view and a top view of a tab washer 31 according to a first embodiment of the tab washer of the present disclosure.
Figure 12:
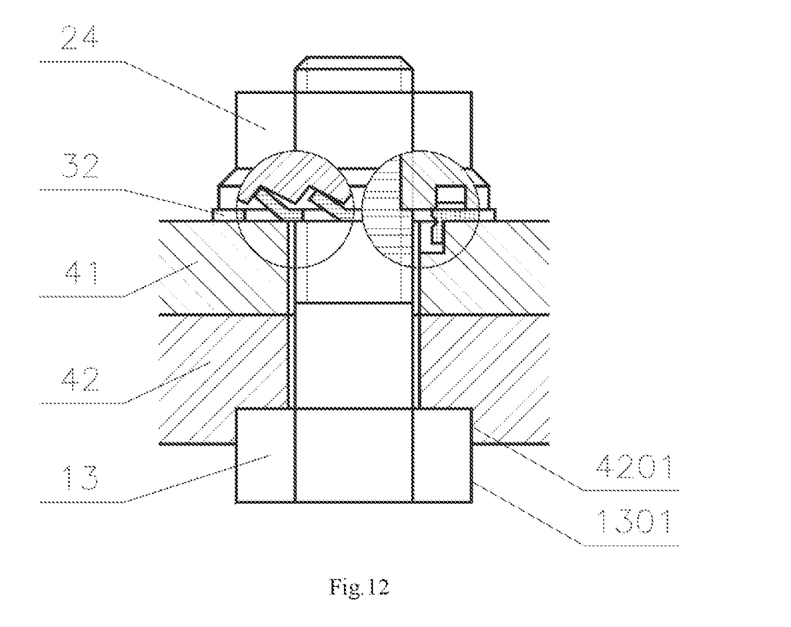
FIG. 12 is a usage status view according to Embodiment 6 of the present disclosure.

As shown in FIG. 2, FIG. 5 and FIG. 12, an anti-loosing bolt component capable of presetting torque and controlling disassembly includes a bolt 13, a nut 24 and a tab washer 32 that match each other. This embodiment is basically the same as the embodiment 1, and the difference is as follow: the bolt 13 of this embodiment replaces the bolt 11 of the embodiment 1. The bolt 13 is an ordinary bolt, and a screw cap 1301 of the bolt 13 is embedded in the embedded groove 4201 provided on the fastener 42. The nut 24 of this embodiment replaces the nut 21 of the embodiment 1. The nut 24 is basically the same as the nut 21, and the difference between the nut 24 and the nut 21 is that the top end of the nut 24 is not provided with a cap. The tab washer 32 of this embodiment replaces the tab washer 31 of the embodiment 1, and the difference between the tab washer 32 and the tab washer 31 and the fixing method are shown in the embodiment 2.

Embodiment 7

Figure 13:
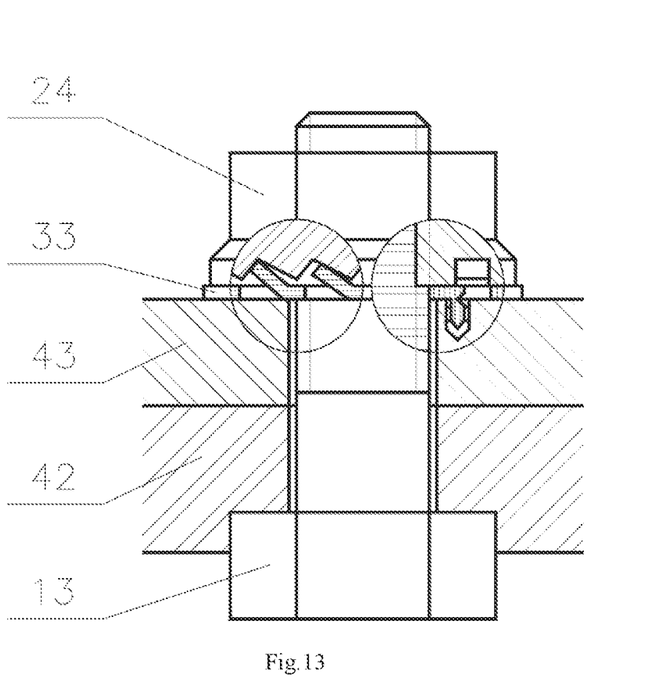
FIG. 13 is a usage status view according to Embodiment 7 of the present disclosure.

As shown in FIG. 2, FIG. 6 and FIG. 13, an anti-loosing bolt component capable of presetting torque and controlling disassembly includes a bolt 13, a nut 24 and a tab washer 33 that match each other. This embodiment is basically the same as the embodiment 6, and the difference is as follow: the tab washer 33 of this embodiment replaces the tab washer 32 of the embodiment 6, and the difference between the tab washer 33 and the tab washer 32 and the fixing method are shown in the embodiment 3.

The above description with reference to the drawings is only a specific embodiment of the present disclosure, but the protection scope of this disclosure is not limited thereto. Any improvement, change or substitution made by those skilled in the art within the technical scope disclosed in this disclosure shall be covered within the protection scope of this disclosure.

What is claimed is:

1. An anti-loosing bolt component capable of presetting torque and controlling disassembly, comprising: a nut, a bolt and a tab washer that match each other;

wherein a radial annular flange is arranged at one end of the nut close to a fastener, or at one end of a screw cap of the bolt close to the fastener, an annular groove is provided at an annular middle position of an end face where the annular flange is located, a ratchet structure is arranged at a bottom surface of the annular groove, and an elastic pawl matched with the ratchet structure is arranged at the tab washer;

or wherein an axial groove is arranged at a screw rod of the bolt; and a horizontal protrusion matched with the axial groove is arranged at the tab washer;

or wherein a vertical protrusion that is folded toward the fastener is arranged at the tab washer; wherein the horizontal protrusion and the vertical protrusion are provided with a prefabricated notch.

2. The anti-loosing bolt component capable of presetting torque and controlling disassembly according to claim 1, wherein an outer diameter of the annular flange is greater than an outer diameter of the nut or the screw cap.

3. The anti-loosing bolt component capable of presetting torque and controlling disassembly according to claim 1, wherein the ratchet structure is evenly and radially arranged, wherein a gentle face of the ratchet structure faces a tightening direction of the nut or the screw cap, a steep face of the ratchet structure faces a loosening direction of the nut or the screw cap, a highest point of the ratchet structure is lower than an end face of the annular flange, and a drop between the highest point and the end face is less than or equal to a thickness of the tab washer.

4. The anti-loosing bolt component capable of presetting torque and controlling disassembly according to claim 1, wherein a matching mode of the ratchet structure and the elastic pawl is as follow: the ratchet structure is arranged in a mode that one ratchet independently matches with one elastic pawl, and the number of ratchets is provided as much as possible; if the number of the elastic pawls is N, a ratio between the number of the elastic pawls and the number of the ratchets is N:N+1 or N:N−1; and wherein the elastic pawl is evenly and radially arranged on an annular ring body of the tab washer to match with the ratchet structure so that when the nut or the screw cap is rotated 1/N angle of one ratchet during tightening, there is one elastic pawl fully engaged and locked with the ratchet structure to prevent the nut or the screw cap from rotating in a loosening direction.

5. The anti-loosing bolt component capable of presetting torque and controlling disassembly according to claim 1, wherein the axial groove is arranged at a threaded section of the screw rod of the bolt along an axial direction, the horizontal protrusion matched with the axial groove is arranged in an inner hole of the tab washer, an expanded bend that is bent along the bottom surface of the axial groove to the top end of the axial groove is arranged at the horizontal protrusion, the prefabricated notch is arranged at a connection position of the horizontal protrusion at an edge of the inner hole of the tab washer; and the horizontal protrusion is matched with the axial groove to prevent the tab washer from rotating; and wherein a fully enclosed cap is further provided on a top end of the nut.

6. The anti-loosing bolt component capable of presetting torque and controlling disassembly according to claim 1, wherein the annular ring body of the tab washer is provided with a rectangular notch that contacts the inner hole from the outer side of the inner hole, or is provided with a rectangular hole that is away from the outer side of the inner hole; wherein the vertical protrusion that is folded toward the fastener is arranged at a lateral outer edge of the rectangular notch or a lateral edge of the rectangular hole, the prefabricated notch is arranged at a connection position of the vertical protrusion at an edge of the bottom of the tab washer, and the vertical protrusion cooperates with a corresponding vertical concave hole provided on an end face of the fastener to prevent the rotation of the tab washer.

7. The anti-loosing bolt component capable of presetting torque and controlling disassembly according to claim 6, wherein a top end of the vertical protrusion of the rectangular hole is set as a pointed end, and the pointed end is located on a section center point of the vertical protrusion, the pointed end is configured to facilitate accurate position of the vertical concave hole; wherein a part of the vertical protrusion excluding the pointed end and the prefabricated notch is set as a cylindrical shape with a diameter same as a diameter of a corresponding standard twist drill, to enable the vertical concave hole cooperated with the vertical protrusion to be formed by one-time drilling.

8. The anti-loosing bolt component capable of presetting torque and controlling disassembly according to claim 6, wherein the elastic pawl, the horizontal protrusion and the vertical protrusion are directly formed through stamping by the tab washer, wherein the horizontal protrusion comprising an expanded bend is formed through integral stamping, the vertical protrusion of the rectangular hole comprising a pointed end is formed through integral stamping, and the rectangular notch and the rectangular hole are formed after the vertical protrusion is stamped by the tab washer.

9. The anti-loosing bolt component capable of presetting torque and controlling disassembly according to claim 1, wherein the prefabricated notch is an etched dent that is configured to make a maximum torque that a cross-sectional area of a connection position can withstand equal to a preset torque and to subtract an excess cross-sectional area;

wherein the preset torque is a torque that is configured to be set through multiplying a tightening torque standard value by a safety factor required to prevent loosening, and configured to prevent the bolt from loosening and control disassembly of the bolt, wherein the tightening torque standard value is specified for the bolt according to a tightening torque specification or according to a known vibration force that causes the bolt to loosen, wherein the safety factor is not less than 1.1 times; and wherein the prefabricated notch can be set on one side or on both sides, and there may be a crack-guiding gap at one or both ends; when a loosening torque is greater than the preset torque, the horizontal protrusion or vertical protrusion breaks at the prefabricated notch and separating from the annular ring body of the tab washer, to enable the bolt to be disassembled.

* * * * *